US008868832B2

(12) United States Patent
Hashimoto (10) Patent No.: US 8,868,832 B2
(45) Date of Patent: Oct. 21, 2014

(54) MEMORY CONTROL DEVICE AND CACHE MEMORY CONTROLLING METHOD

(75) Inventor: Akinori Hashimoto, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 707 days.

(21) Appl. No.: 12/965,573

(22) Filed: Dec. 10, 2010

(65) Prior Publication Data

US 2011/0161549 A1   Jun. 30, 2011

(30) Foreign Application Priority Data

Dec. 28, 2009   (JP) ................................. 2009-297462

(51) Int. Cl.
*G06F 12/00* (2006.01)
*G06F 12/08* (2006.01)

(52) U.S. Cl.
CPC .................................. *G06F 12/0862* (2013.01)
USPC ........................... 711/118; 711/154; 711/170

(58) Field of Classification Search
USPC .......................................... 711/118, 154, 170
See application file for complete search history.

(56) References Cited

U.S. PATENT DOCUMENTS 6,360,310 B1   3/2002   Au

FOREIGN PATENT DOCUMENTS

| JP | 01-276336 A | 11/1989 |
| JP | 10-333980 A | 12/1998 |
| JP | 2001-216156 | 8/2001 |

*Primary Examiner* — Matthew Bradley
(74) *Attorney, Agent, or Firm* — Arent Fox LLP (57) ABSTRACT

A memory control device for controlling an access from a processing unit to a cache memory, the memory control device includes: an address estimation circuit for receiving a first read address of the cache memory from the processing unit and estimating a second read address on the basis of the first read address; an access start detection circuit for detecting an access start of accessing cache memory at the first read address and outputting an access start signal; a data control circuit for receiving read data from the cache memory and for outputting the read data to the processing unit; and a clock control circuit for controlling a read clock to be output to the processing unit in response to the access start signal, the processing unit receiving the read data from the data control circuit with the read clock.

12 Claims, 13 Drawing Sheets

MEMORY CONTROL DEVICE AND CACHE MEMORY CONTROLLING METHOD

CROSS-REFERENCE TO RELATED APPLICATION

This application is based upon and claims the benefit of priority from the prior Japanese Patent Application No. 2009-297462 filed on Dec. 28, 2009, the entire contents of which are incorporated herein by reference.

FIELD

The embodiments discussed herein are related to a memory control device and a cache memory controlling method.

BACKGROUND

In recent years, as the configuration of digital equipment is complicated, it has become desirable to increase the operating speed and performance of a system LSI (Large Scale Integration circuit) which is to be mounted onto the equipment. In particular, high-speed operation of a CPU (Central Processing Unit) which is built into the system LSI has become more desirable than ever.

Typically, in many cases, as a method of operating the CPU at a high speed which would be generally adopted, such a drastic countermeasure as to, for example, increase the number of stages of pipelines that defines the operation of the CPU is taken.

Even when a drastic countermeasure as mentioned above is taken, it may be still desirable that, for example, in setting an access timing between a random logical circuit of the CPU and a cache memory (for example, a primary cache memory) that the CPU itself holds therein, data be read out of the cache memory with no wait in order to increase its throughput.

In addition, as the operating speed of the random logical circuit (an internal logical circuit) in the CPU is increased, it may become desirable to reduce the access time for reading data out of a cache memory (for example, an SRAM: Static Random Access Memory).

Incidentally, nowadays, various memory accessing techniques and information processing techniques for increasing the speed at which a CPU gains access to a memory and various circuits for realizing high-speed data reading out of a cache memory (an SRAM) are proposed.

The operating speed of the CPU (the processing unit) may be further increased by increasing the number of stages of pipelines as described above. However, even if the performance of the logical circuit is improved, it may be difficult to increase the operating speed of the cache memory (the SRAM).

That is, in order to accelerate (increase the operating speed of) the cache memory concerned, it may be desirable to accelerate, for example, the SRAM itself which is used in the cache memory. However, under the current circumstances, it may be difficult to accelerate the SRAM.

In addition, nowadays, for example, the operating speed of the CPU into which the cache memory such as the SRAM is built may become more liable to be controlled by the access time for reading data out of the SRAM and the timing of a data path between the cache memory and the random logical circuit of the CPU.

Figure 1:
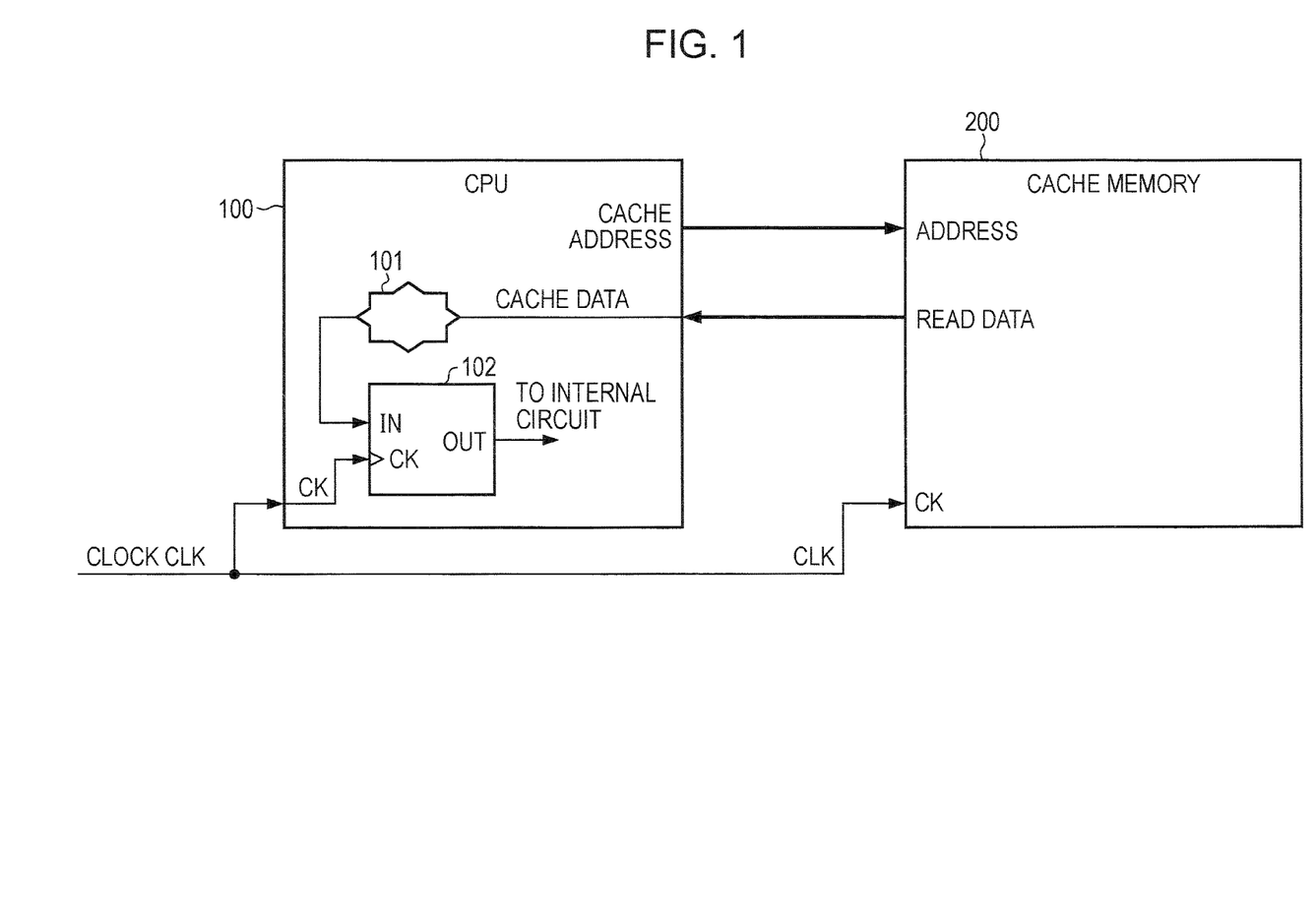
FIG. 1 is a block diagram illustrating one example of a semiconductor integrated circuit device.
Figure 2:
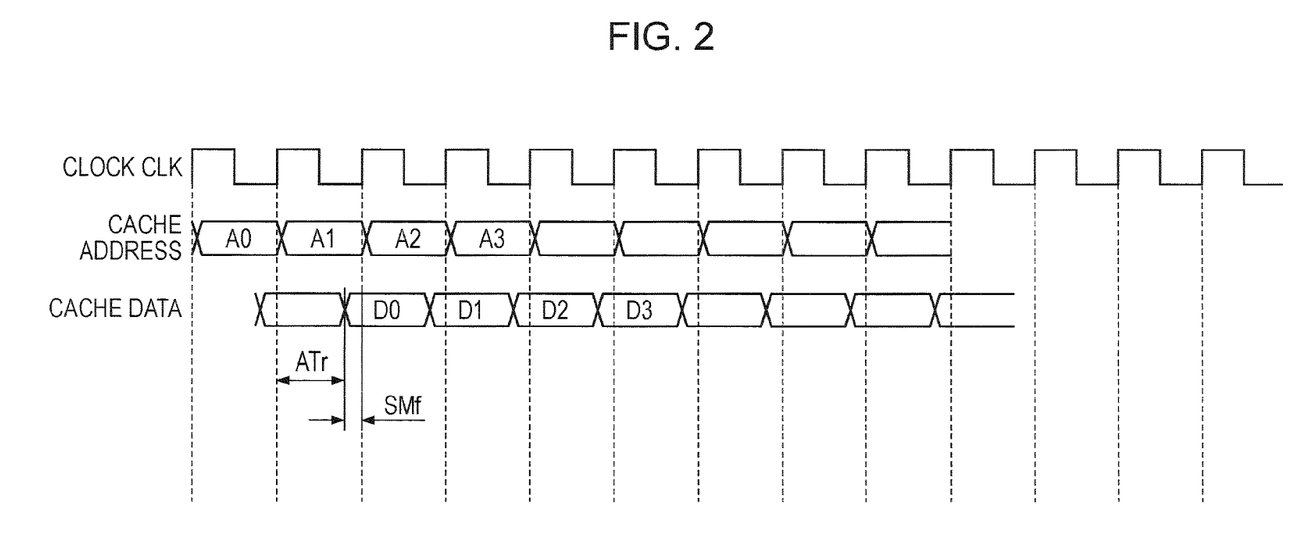
FIG. 2 is a diagram illustrating an example of a timing chart for explaining the operation of the semiconductor integrated circuit device in FIG. 1.

FIG. 1 is a block diagram illustrating an example of a semiconductor integrated circuit device. 1. FIG. 2 is a diagram illustrating an example of a timing chart for explaining the operation of the semiconductor integrated circuit device illustrated in FIG. 1. Incidentally, the semiconductor integrated circuit device illustrated in FIGS. 1 and 2 is of the type that data is read out of a cache memory with no wait.

In FIG. 1, the example of the semiconductor includes a processing unit (a CPU) 100, a random logical circuit 101, an internal flip-flop 102 and a cache memory 200 (an SRAM).

Incidentally, the cache memory 200 is not limited to, for example, the cache memory of the type which is installed in a semiconductor integrated circuit device such as a system LSI and may be a primary or secondary cache memory which is built into the CPU 100 itself.

As illustrated in the example in FIG. 2, even in the case that data is read out of the cache memory 200 with no wait, an access time ATr which is taken to gain access to the SRAM in one cycle of a clock CLK is increased and a setup margin SMf which is spared for data supply to the next-stage flip-flop 102 is decreased.

Therefore, it may become difficult for the semiconductor integrated circuit device illustrated in FIG. 1 to increase the frequency of the clock CLK and hence it may become also difficult to meet such requirements that the operating speed and performance of, for example, the system LSI into which the CPU is built or digital equipment onto which the system LSI circuit is mounted be increased.

Figure 3:
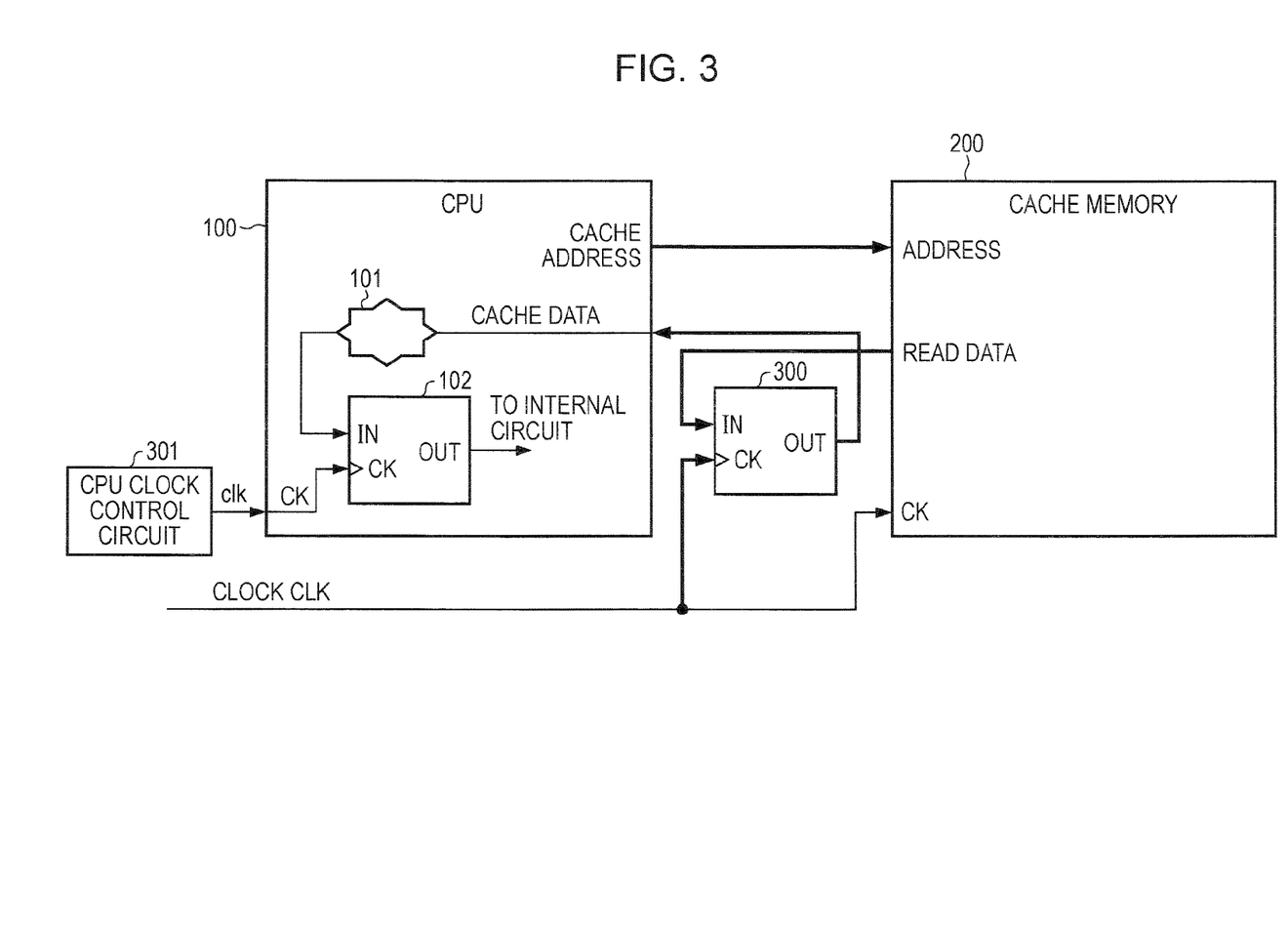
FIG. 3 is a block diagram illustrating another example of the semiconductor integrated circuit device.
Figure 4:
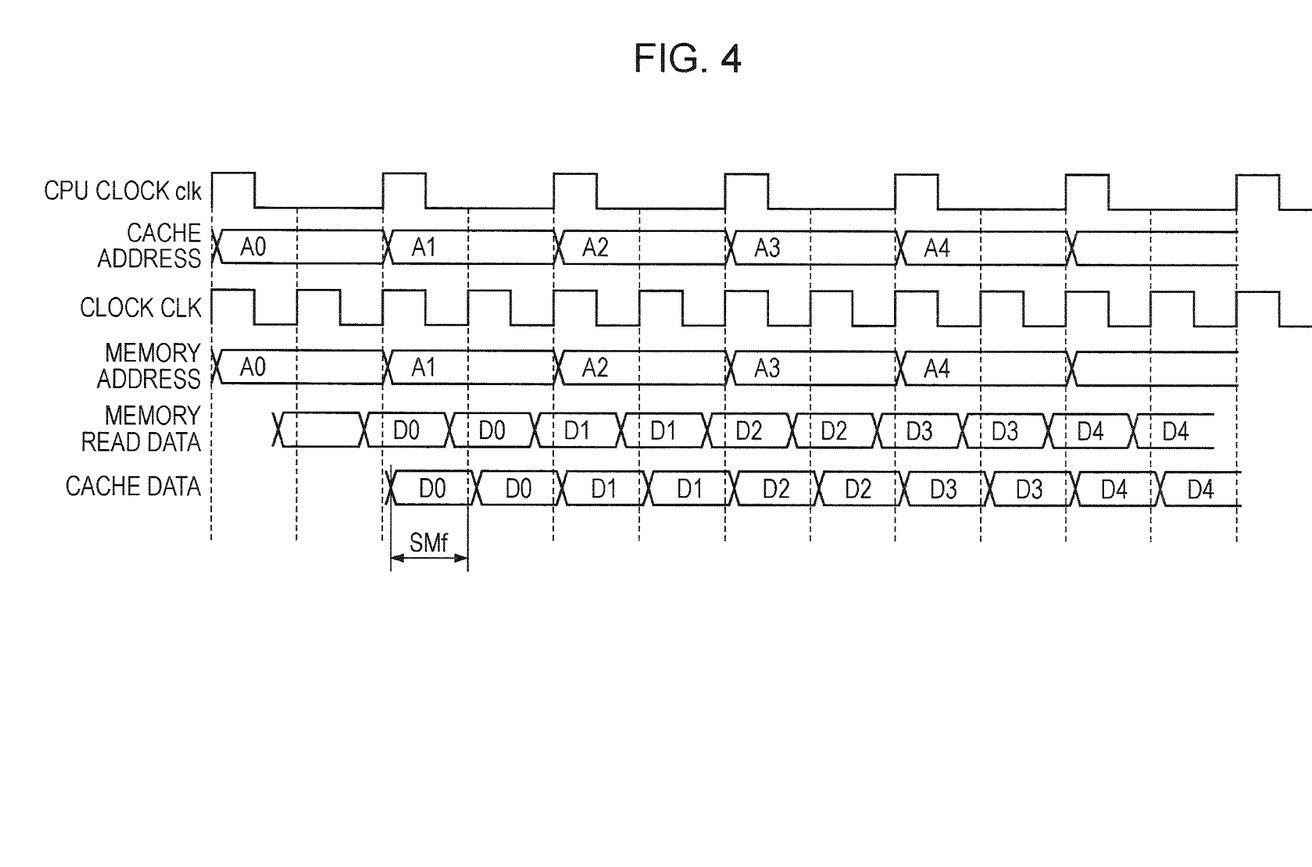
FIG. 4 is a diagram illustrating an example of a timing chart for explaining the operation of the semiconductor integrated circuit device in FIG. 3.

FIG. 3 is a block diagram illustrating another example of the semiconductor integrated circuit device. FIG. 4 is a diagram illustrating a timing chart for explaining the operation of the semiconductor integrated circuit device illustrated in FIG. 3. Incidentally, the semiconductor integrated circuit device which will be explained with reference to FIGS. 3 and 4 is of the type that a flip-flop 300 is provided between the cache memory 200 and the CPU 100.

In the semiconductor integrated circuit device illustrated in FIG. 3, a data path between the cache memory 200 and the random logical circuit 101 of the CPU 100 is once cut off by inserting the flip-flop 300 between them and hence it may be expected to increase the operating speed of the CPU 100.

That is, as illustrated in the example in FIG. 4, owing to the provision of the flip-flop 300, the setup margin SMf which is spared for data supply to the next-stage flip-flop 102 may be increased.

However, in the semiconductor integrated circuit device illustrated in FIG. 3, although the CPU 100 expects to acquire the read data from the cache memory 200 with no wait, arrival of the read data is delayed for a time period corresponding to one cycle owing to the presence of the flip-flop 300.

Therefore, it may be unavoidable to provide a CPU clock control circuit 301 that generates a CPU clk of one cycle from the clock CLK of two cycles so as to operate the CPU 100 at a half-frequency of the frequency of the clock CLK, which may lead to reduction of throughput of the CPU 100.

Specifically, in the case that eight pieces of data have been read out of the cache memory 200 in succession using the CPU 100, the clock CLK of two cycles may be desired every time one piece of data is acquired as will be expressed in the following formula: 8/(8×2)=50%. That is, the performance of the CPU 100 may be reduced by 50%.

The followings are reference documents.
[Document 1] Japanese Laid-open Patent Publication No. 10-333980.
[Document 2] Japanese Laid-open Patent Publication No. 01-276336.

SUMMARY

According to an aspect of the embodiment, a memory control device for controlling an access from a processing unit to a cache memory, the memory control device includes: an address estimation circuit for receiving a first read address of the cache memory from the processing unit and estimating a second read address on the basis of the first read address; an access start detection circuit for detecting an access start of accessing cache memory at the first read address and outputting an access start signal; a data control circuit for receiving read data from the cache memory and for outputting the read data to the processing unit; and a clock control circuit for controlling a read clock to be output to the processing unit in response to the access start signal, the processing unit receiving the read data from the data control circuit with the read clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 5:
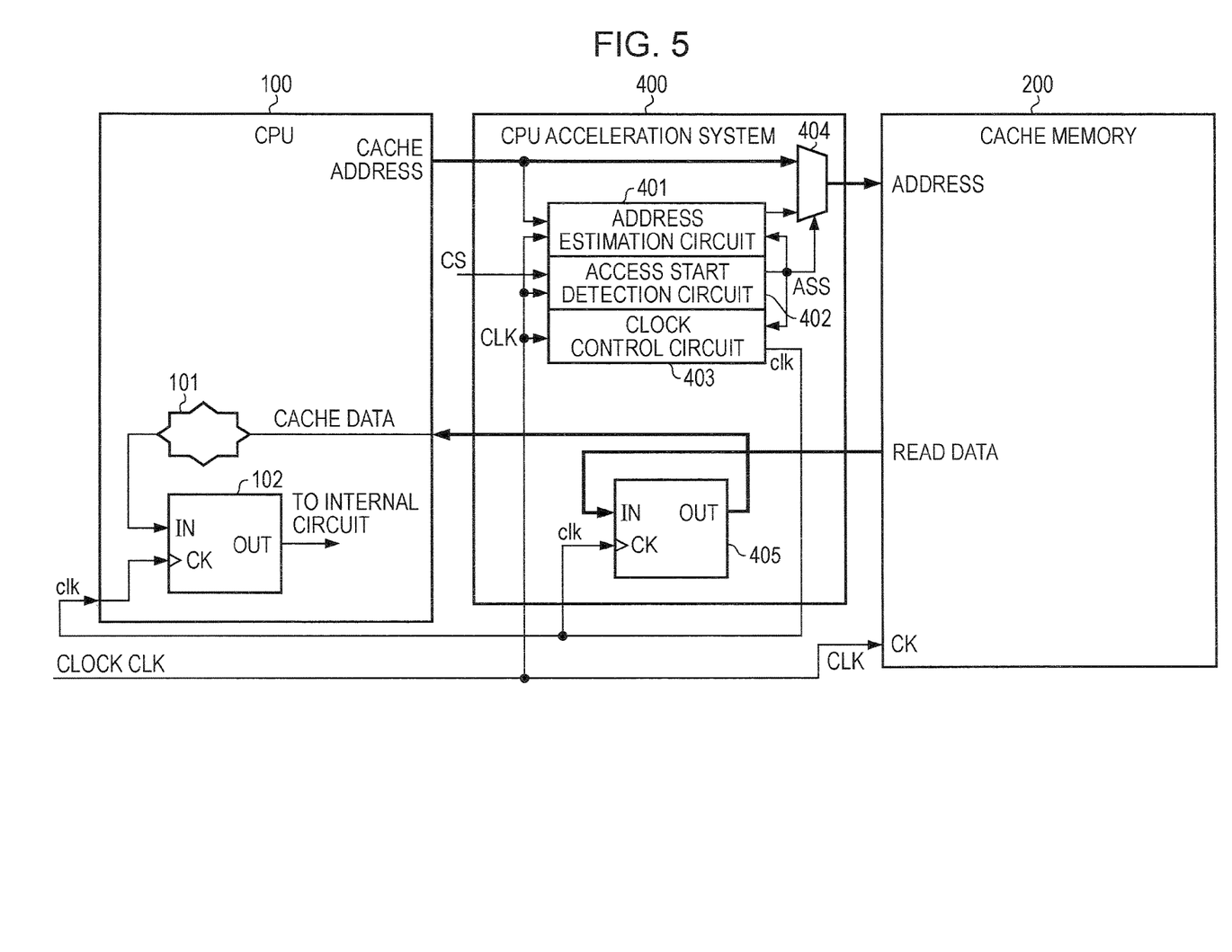
FIG. 5 is a block diagram illustrating an example of a semiconductor integrated circuit device according to a first embodiment.
Figure 6:
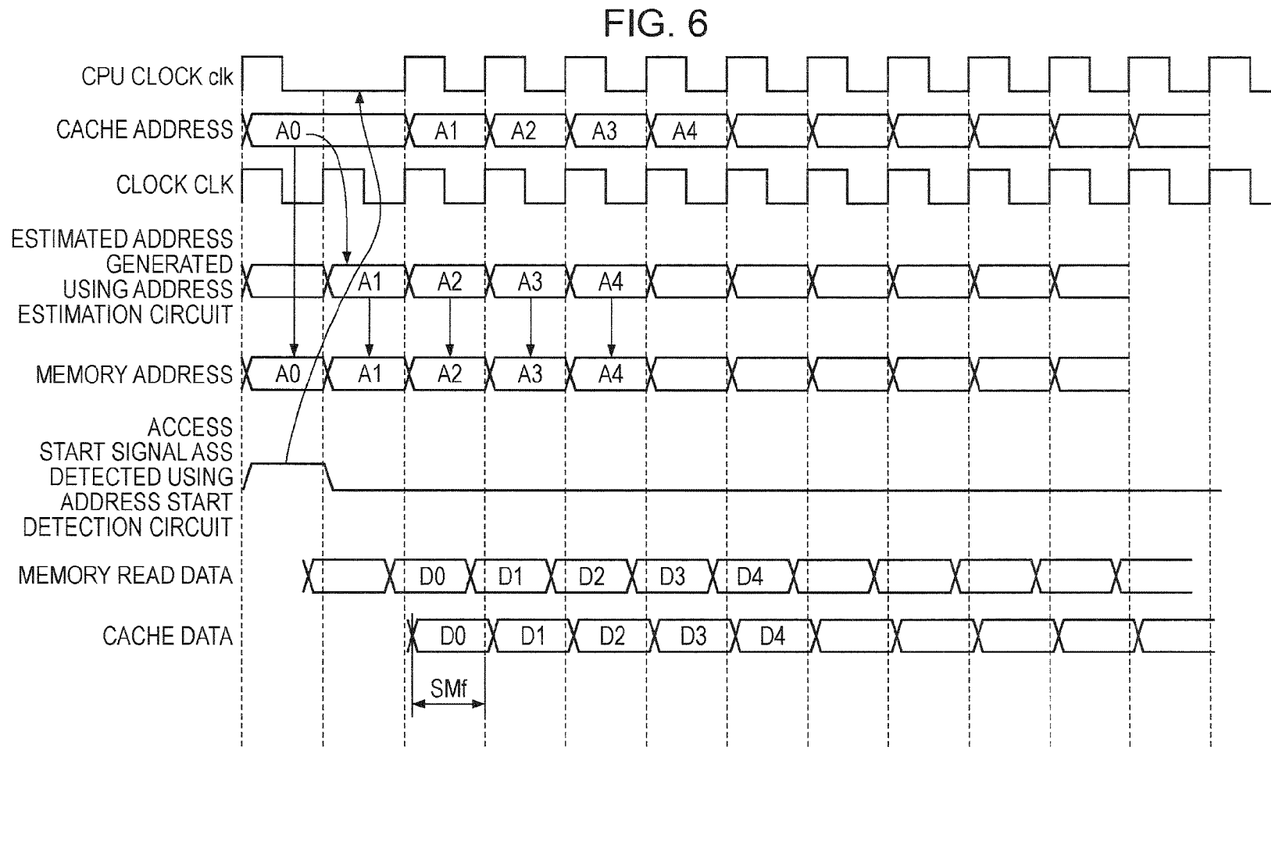
FIG. 6 is a diagram illustrating an example of a timing chart for explaining the operation of the semiconductor integrated circuit device in FIG. 5.

FIG. 5 is a block illustrating an example of a semiconductor integrated circuit device according to a first embodiment. FIG. 6 is a diagram illustrating an example of a timing chart for explaining the operation of the semiconductor integrated circuit device in FIG. 5.

In FIG. 5, the semiconductor integrated circuit device of the first embodiment includes a processing unit (a CPU) 100, a random logical circuit 101, an internal flip-flop 102, a cache memory (an SRAM) 200 and a CPU acceleration system 400.

In addition, the CPU acceleration system 400 includes an address estimation circuit 401, an access start detection circuit 402, a clock control circuit 403, a selector 404, and a delay circuit (a flip-flop for delay) 405.

Incidentally, the cache memory 200 is not limited to a cache memory of the type that is installed in a semiconductor integrated circuit device such as, for example, a system LSI and may be a primary or secondary cache memory which is built into the CPU 100 itself.

As illustrated in the example in FIG. 5, the CPU 100 includes ports (terminals for cache address and cache data) which are used to gain access to the cache memory 200. In reality, the CPU 100 also includes a chip select ports, a write enable port, a write data port and the like which are used to gain access to the cache memory 200, in addition to the above mentioned ports. However, description thereof will be omitted.

The CPU acceleration system 400 includes the address estimation circuit 401, the access start detection circuit 402, the clock control circuit 403, the selector 404, and the flip-flop for delay 405. Incidentally, the CPU acceleration system 400 is so named for convenience' sake in order to clearly distinguish it from, for example, the semiconductor integrated circuit device of the type illustrated in FIG. 1.

As illustrated in the examples in FIG. 5 and FIG. 6, when first read access is generated from the CPU 100 to the cache memory 200, a read address thereof (a cache address A0) is supplied to the address estimation circuit 401 and the selector 404.

Incidentally, in order to notify the access start detection circuit 402 of generation of the first read access, a chip select signal CS to be used for access to the cache memory 200 is supplied in advance from the CPU 100 to the access start detection circuit 402.

Then, the access start detection circuit 402 detects that the first read access has been generated from the CPU 100 and outputs (asserts) an access start signal ASS to the selector 404.

The address estimation circuit 401 estimates and generates the next (a second) read address A1 on the basis of the cache address A0 sent from the CPU 100.

The estimated read address A1 is supplied to the selector 400 and then third and succeeding estimated read addresses A2, A3, ... are generated using the address estimation circuit 401 and are supplied to the selector 400 in the same manner as the above.

Incidentally, as will be described later, the access start signal ASS is also supplied to the access estimation circuit 401 and respective estimated addresses are generated by sequentially adding a predetermined additional value which is defined, for example, in accordance with the specification of the CPU 100 to the previous address.

The selector 404 to which the access start signal ASS has been asserted from the access start detection circuit 402 selects the read address (A0) sent from the CPU 100.

In the case that any access start signal is not asserted from the access start detection circuit 402, that is, data is to be transferred with the second and succeeding read addresses, the selector 404 selects the estimated read addresses (A1, A2, A3, ...) which have been generated using the address estimation circuit 401.

In addition, each read address which has been selected using the selector 404 is supplied to a terminal for address of the cache memory 200.

Then, after a predetermined read assess time has elapsed, read data is output from a terminal for read data of the cache memory 200 and is supplied to an input of the flip-flop for delay 405.

An output signal (a CPU clock) clk from the clock control circuit 403 which will be described later is supplied to a clock terminal of the flip-flop for delay 405 and the flip-flop for delay 405 takes therein the read data, for example, at a rise edge of the CPU clock clk and outputs the read data at the next rise edge of the CPU clock clk.

The signal (delayed read data) which has been output from the flip-flop for delay 405 is supplied to the terminal for cache data of the CPU 100 and then supplied to an input terminal of the internal flip-flop 102, for example, via the internal random logical circuit 101.

Owing to the above mentioned operations, a margin in time which is spared for data supply to the internal flip-flop 102 may be included in, for example, the read data which has been output at the rise edge of the CPU clock clk.

Specifically, when the first read address is generated from the CPU 100, the selector 404 selects the cache address A0 in response to the access start signal ASS and the clock control circuit 403 stops supply of the CPU clock clk for a time period corresponding to one cycle.

Owing to the above mentioned operations, it may become possible to avoid an injurious effect which would be caused by a one-cycle delay of the read data in arriving at the CPU 100 via the flip-flop for delay 405.

That is, it may be allowed to provide data D0 corresponding to the address A0 of the first read access sent from the CPU 100 in a state in which it fills a setup margin SMf which is spared for data supply to the internal flip-flop 102 as illustrated in the example in FIG. 6.

In addition, for second and succeeding accesses, the selector 404 sequentially selects the addresses A1, A2, A3, ... which are generated using the address estimation circuit 401, so that pieces of read data D1, D2, D3, ... are output from the cache memory 200 in synchronization with the clock CLK.

The above mentioned operations are performed for the purpose of making the clock control circuit 403 control the CPU clock clk to be output at the same timing (frequency) as the clock CLK for the second and succeeding accesses as illustrated in the example in FIG. 6.

Owing to the above mentioned operations, it may become possible to affect the second and succeeding accesses from the CPU 100 with the CPU clock CLK of the same frequency as the clock CLK and hence it may become possible to increase the operating frequency while reducing degradation of performance of the CPU 100.

According to the semiconductor integrated circuit device of the first embodiment, it may become possible to reduce degradation of performance of the CPU 100 by delaying only the first access from the CPU 100 by a time period corresponding to one cycle.

Specifically, for example, assuming that such a situation occurs that eight successive pieces of data have been read out of the cache memory 200 in response to the access from the CPU 100, only nine cycles (8+1=9) may be taken for data reading, that is, 8/9=89[%] and hence degradation of performance of the CPU may be limited to 11%.

In addition, a path for read data which is established between the CPU 100 and the cache memory 200 is partitioned by interposing the flip-flop for delay 405 between them, so that it may become possible to further increase the operating frequency.

Figure 7:
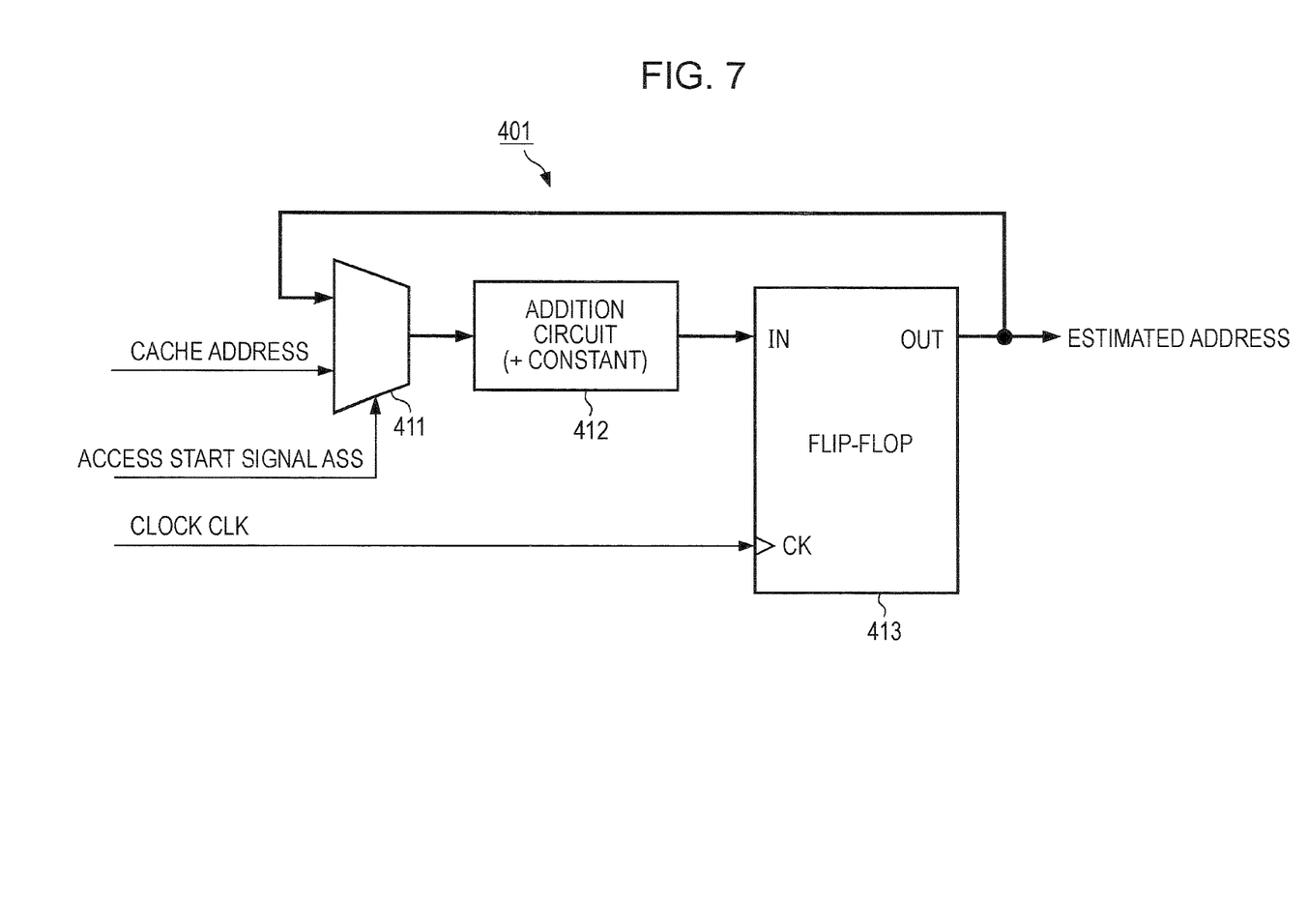
FIG. 7 is a diagram illustrating an example of an address estimation circuit in the semiconductor integrated circuit device in FIG. 5.
Figure 8:
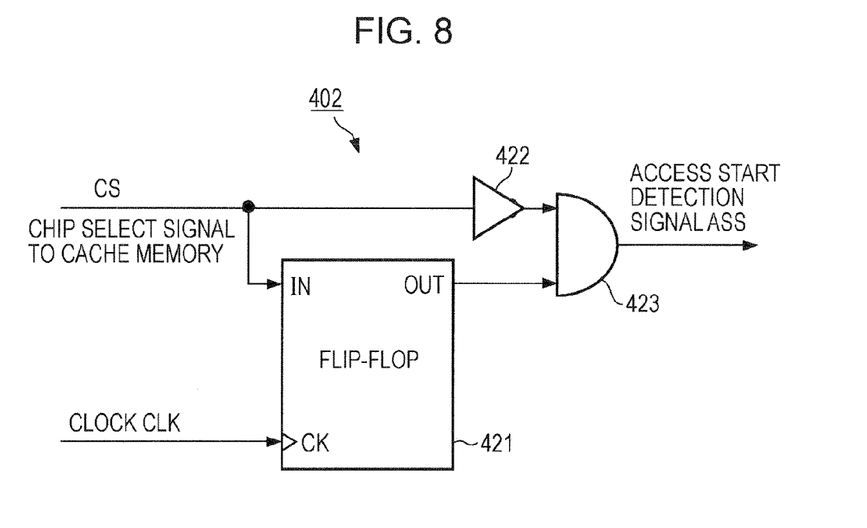
FIG. 8 is a diagram illustrating an example of an access start detection circuit in the semiconductor integrated circuit device in FIG. 5.
Figure 9:
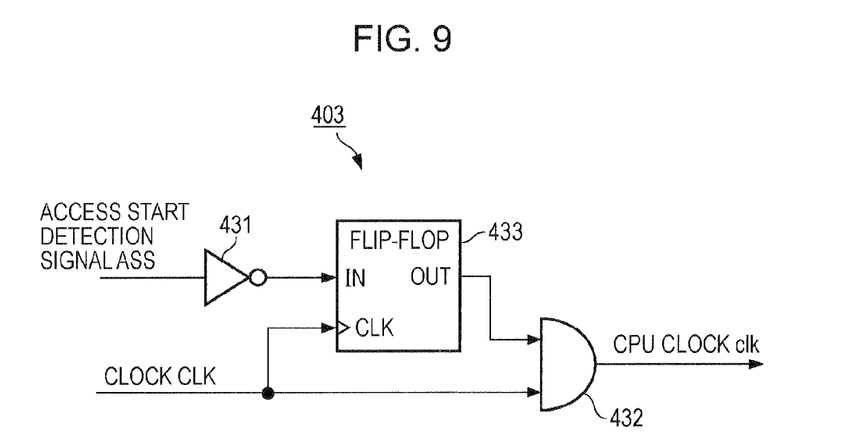
FIG. 9 is a diagram illustrating an example of a clock control circuit in the semiconductor integrated circuit device in FIG. 5.

FIG. 7 is a diagram illustrating an example of the address estimation circuit in the semiconductor integrated circuit device illustrated in FIG. 5 and FIG. 8 is a diagram illustrating an example of the access start detection circuit in the semiconductor integrated circuit device illustrated in FIG. 5. In addition, FIG. 9 is a diagram illustrating an example of the clock control circuit in the semiconductor integrated circuit device illustrated in FIG. 5.

First, as illustrated in the example in FIG. 7, the address estimation circuit 401 includes a selector 411, an addition circuit 412 and a flip-flop 413.

The selector 411 receives the cache address from the CPU 100 and an estimated address which is output from the flip-flop 413 and selects one of them in accordance with the access start signal ASS which has been generated using the access start detection circuit 402.

That is, in the case that the first read address is generated from the CPU 100 and hence the access start signal ASS is output from the access start detection circuit (the signal is set at a high level "H" in the example illustrated in FIG. 6), the selector 411 selects the cache address and supplies it to the addition circuit 412.

In addition, since the access start signal ASS is set at a low level "L" for the second and succeeding read accesses made from the CPU 100, the selector 411 selects the estimated address and supplies it to the addition circuit 412.

Then, the addition circuit 412 adds, for example, a predetermined value (a constant) which is defined in accordance with the specification of the CPU 100 to the address selected using the selector 411 and supplies the address with the value added to an input terminal of the flip-flop 413.

Then, the flip-flop 413 takes therein the address which has been supplied to its input terminal, for example, at a rise edge of the clock CLK and outputs the address from its output terminal as the estimated address.

In addition, as illustrated in the example in FIG. 8, the access start detection circuit 402 includes a flip-flop 421, an inverter 422 and an AND gate 423.

The flip-flop 421 receives, for example, the chip select signal CS to be used for access to the cache memory 200 at its input terminal and takes therein the signal at a rise edge of the clock CLK.

An output signal from the flip-flop 421 is supplied to the AND gate 423 together with a signal which is obtained by inverting the chip select signal CS using the inverter 422 and a signal which is obtained by ANDing these signals is output from the AND gate 423 as the access start signal ASS.

Specifically, for example, the chip select signal CS is a low enabling signal which is used to detect the first access to the cache memory 200 from the CPU 100 so as to generate the access start signal ASS which is set at a high level "h".

In addition, as illustrated in the example in FIG. 9, the clock control circuit 403 includes an inverter 431, an AND gate 432 and a flip-flop 433.

The flip-flop 433 takes therein a signal obtained by inverting the access start signal ASS using the inverter 431 at a rise edge of the clock CLK. A signal obtained by ANDing an output from the flip-flop 433 and the clock CLK is output from the AND gate 432 as the CPU clock clk.

That is, as illustrated in the example in FIG. 6, the CPU clock clk is held at a low level "L" in a cycle following a cycle in which the access start signal ASS which is output in response to detection of the first access to the cache memory 200 has been set at a high level "H" and is turned into a signal of the cycle which is two times that of the clock CLK.

Then, the CPU clock clk is turned into a signal of the cycle which is the same as that of the clock CLK for the second and succeeding accesses to the cache memory 200.

Incidentally, the configurations of the address estimation circuit 401 illustrated in FIG. 7, the access start detection circuit 402 illustrated in FIG. 8 and the clock control circuit 403 illustrated in FIG. 9 are mere examples and may be altered in a variety of ways.

Figure 10:
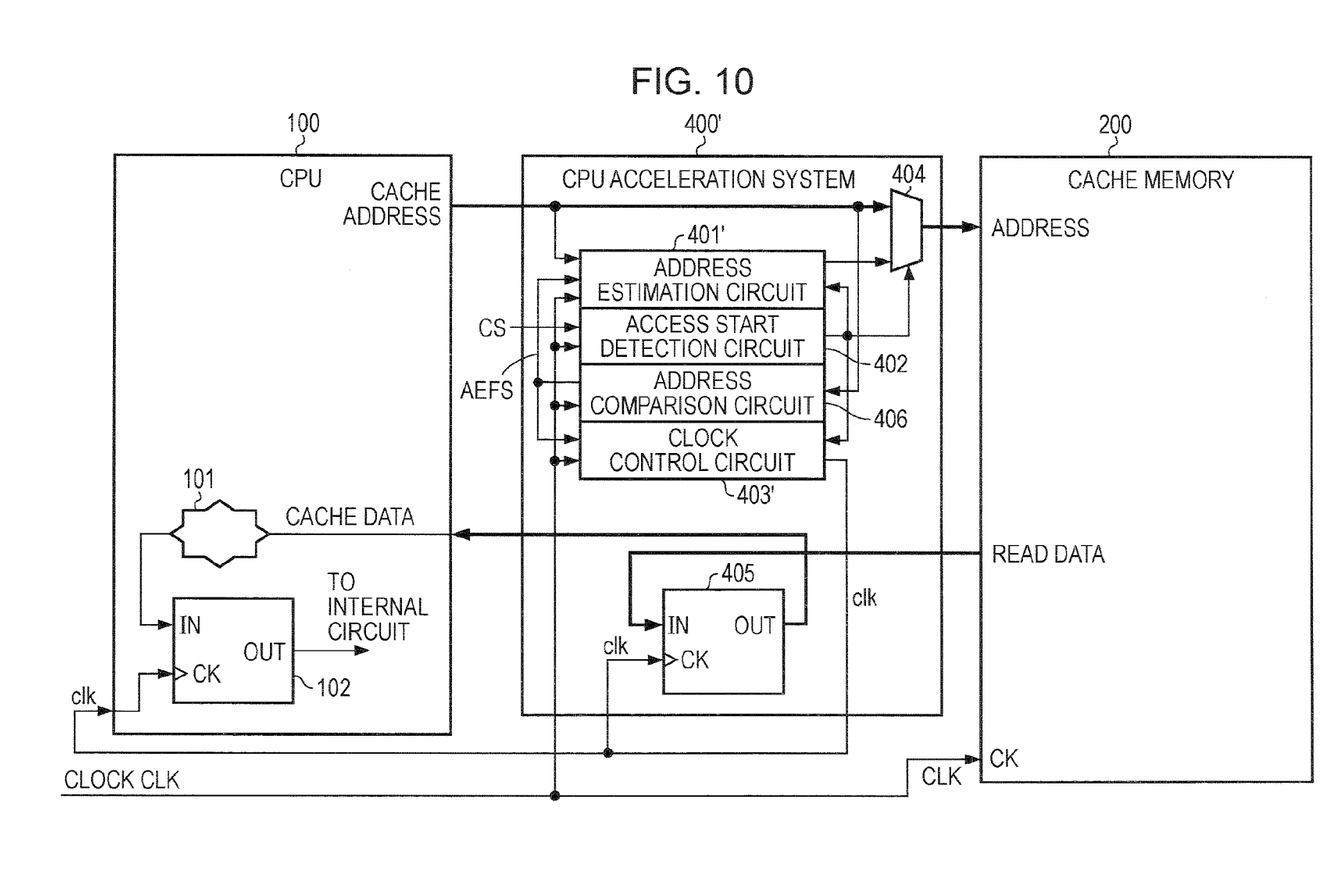
FIG. 10 is a diagram illustrating an example of a semiconductor integrated circuit according to a second embodiment.
Figure 11:
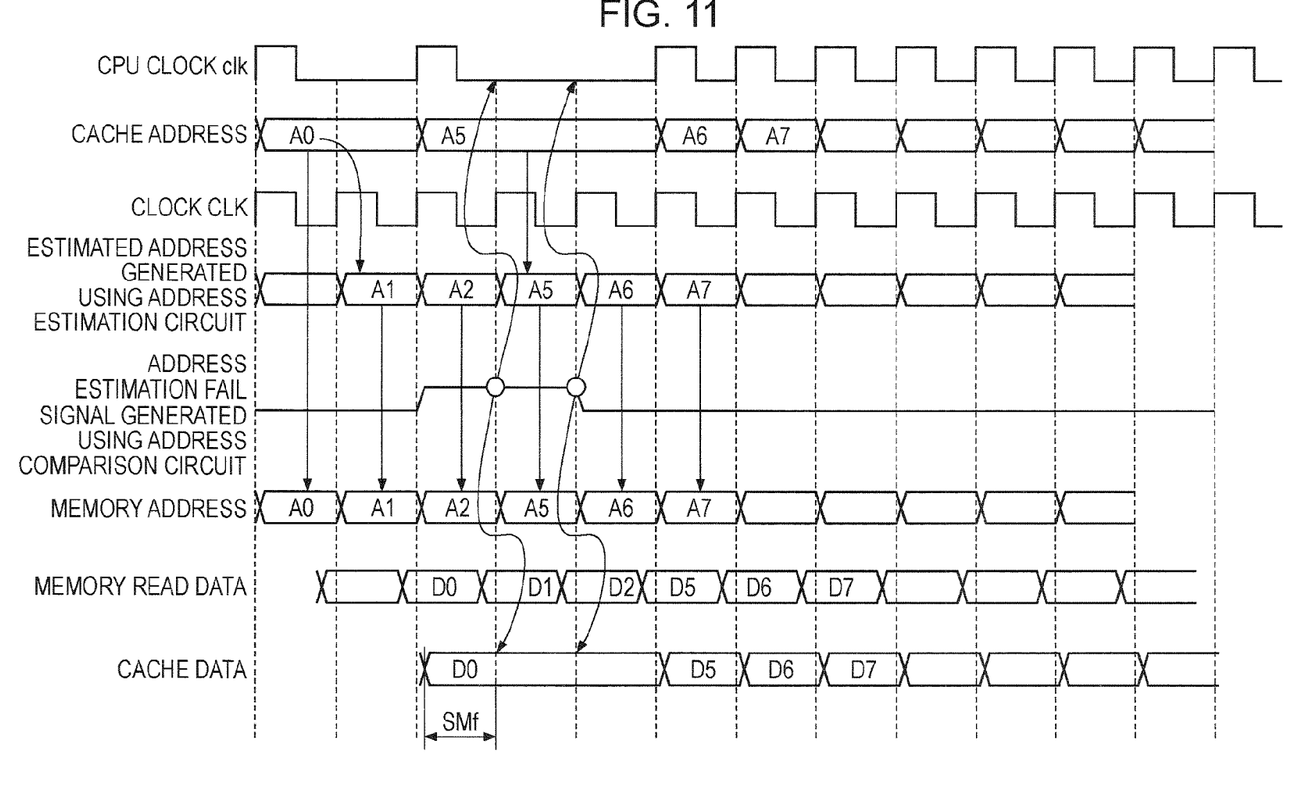
FIG. 11 is a diagram illustrating an example of a timing chart for explaining the operation of the semiconductor integrated circuit device in FIG. 10.

FIG. 10 is a block diagram illustrating an example of a semiconductor integrated circuit device according to a second embodiment. FIG. 11 is a diagram illustrating an example of a timing chart for explaining the operation of the semiconductor integrated circuit device illustrated in FIG. 10.

As apparent from comparison of the device in FIG. 10 with the device in FIG. 5, the semiconductor integrated circuit device according to the second embodiment differs from the semiconductor integrated circuit device according to the first embodiment illustrated in FIG. 5 in that an address comparison circuit 406 is provided in addition to the elements included in the semiconductor integrated circuit device illustrated in FIG. 5.

That is, in the semiconductor integrated circuit device according to the first embodiment, in some cases, the address estimation circuit 401 may not estimate so accurately the cache address sent from the CPU 100.

Thus, the semiconductor integrated circuit device according to the second embodiment is configured so as to cope with such a situation that the address estimation circuit has failed to estimate the address to be output, that is, the estimated address that the address estimation circuit has generated is different from an address with which the CPU gains access to the cache memory.

As illustrated in the example in FIG. 10, a CPU acceleration system 400' includes an address estimation circuit 401', the access start detection circuit 402, a clock control circuit 403', the selector 404, the flip-flop for delay 405, and the address comparison circuit 406. Incidentally, the CPU acceleration system 400' is so named merely for convenience' sake as in the case of the above mentioned system 400. FIG. 11 is a diagram illustrating an example of a timing chart for explaining the operation of the CPU acceleration system 400' in FIG. 10.

First, as illustrated in the example in FIG. 11, a case in which the cache address with which the CPU 100 gains access to the cache memory 200 is changed to A0, to A5, to A6 and to A7 will be considered.

In the above mentioned case, the address estimation circuit 401' estimates that addresses A1 and A2 will be generated as second and third addresses judging from the first value A0 of the cache address sent from the CPU 100. That is, the address which is estimated using the address estimation circuit 401' is changed to A0, to A1 and to A2.

As illustrated in the example in FIG. 10, the address comparison circuit 406 compares the cache address from the CPU 100 with the estimated address generated using the address estimation circuit 401' and when the address values thereof are different from each other, outputs an address estimation fail signal AEFS.

In the above mentioned case, since the address estimation circuit 401' has generated the cache addresses A1 and A2 which are different from the cache addresses A5 and A6, the address estimation fail signal AEFS is asserted from the address comparison circuit 406.

As illustrated in the example in FIG. 11, the address estimation fail signal AEFS is asserted (set at a high level "H"), for example, only for a time period corresponding to two cycles of the clock CLK.

The clock control circuit 403' receives the address estimation fail signal AEFS and stops sending the CPU clock clk to the CPU 100 for a time period corresponding to two cycles of the clock CLK.

In response to stopping of the CPU clock clk, data D0 (an output signal from the flip-flop for delay 405) which corresponds to the cache address and will be received by the CPU 100 is also retained for a time period corresponding to three cycles of the clock CLK.

The data D0 is retained in order to avoid such a situation that failure of the address estimation circuit 401' in address estimation adversely affects the CPU 100.

While the address estimation fail signal AEFS is being asserted and sending of the CPU clock clk is being stopped, the read address which is sent to the cache memory 200 is changed to A5 using the address estimation circuit 401' as will be described later with reference to FIG. 12 after it has been changed to A0, to A1 and to A2.

In the above mentioned situation, the clock CLK is being supplied to the cache memory 200 regardless of assertion of the address estimation fail signal AEFS and pieces of read data D0, D1 and D2 are output from the cache memory 200 corresponding to the read addresses A0, A1 and A2.

The pieces of read data D0, D1 and D2 are supplied to the flip-flop for delay 405. The flip-flop for delay 405 is configured to operate with the CPU clock clk.

That is, the flip-flop for delay 405 is configured to supply only the read data D0 that it has taken therein first to the CPU 100 and not to supply the pieces of read data D1 and D2 to the CPU 100 while the address estimation fail signal AEFS is being asserted.

As a result of a failure of the address estimation circuit 401' in address estimation, the cache address A5 sent from the CPU 100 is taken into the CPU acceleration system 400' as the next memory address.

That is, as will be described later, the address estimation circuit 401' outputs the cache address A5 which has been sent from the CPU 100 as the estimated address in response to assertion of the address estimation fail signal AEFS.

Then, if addresses which are compared with each other using the address comparison circuit 406 match with each other, the address estimation fail signal AEFS will be negated (released).

With release of the address estimation fail signal AEFS, the CPU clock control circuit 403' releases stopping of the CPU clock clk and the CPU 100 drives an address A6 which comes next to the read address A5 as the cache address.

Incidentally, the address estimation circuit 401' generates estimated addresses A6 and A7 from the address A5 which has already been taken therein to be used for access to the cache memory.

Figure 12:
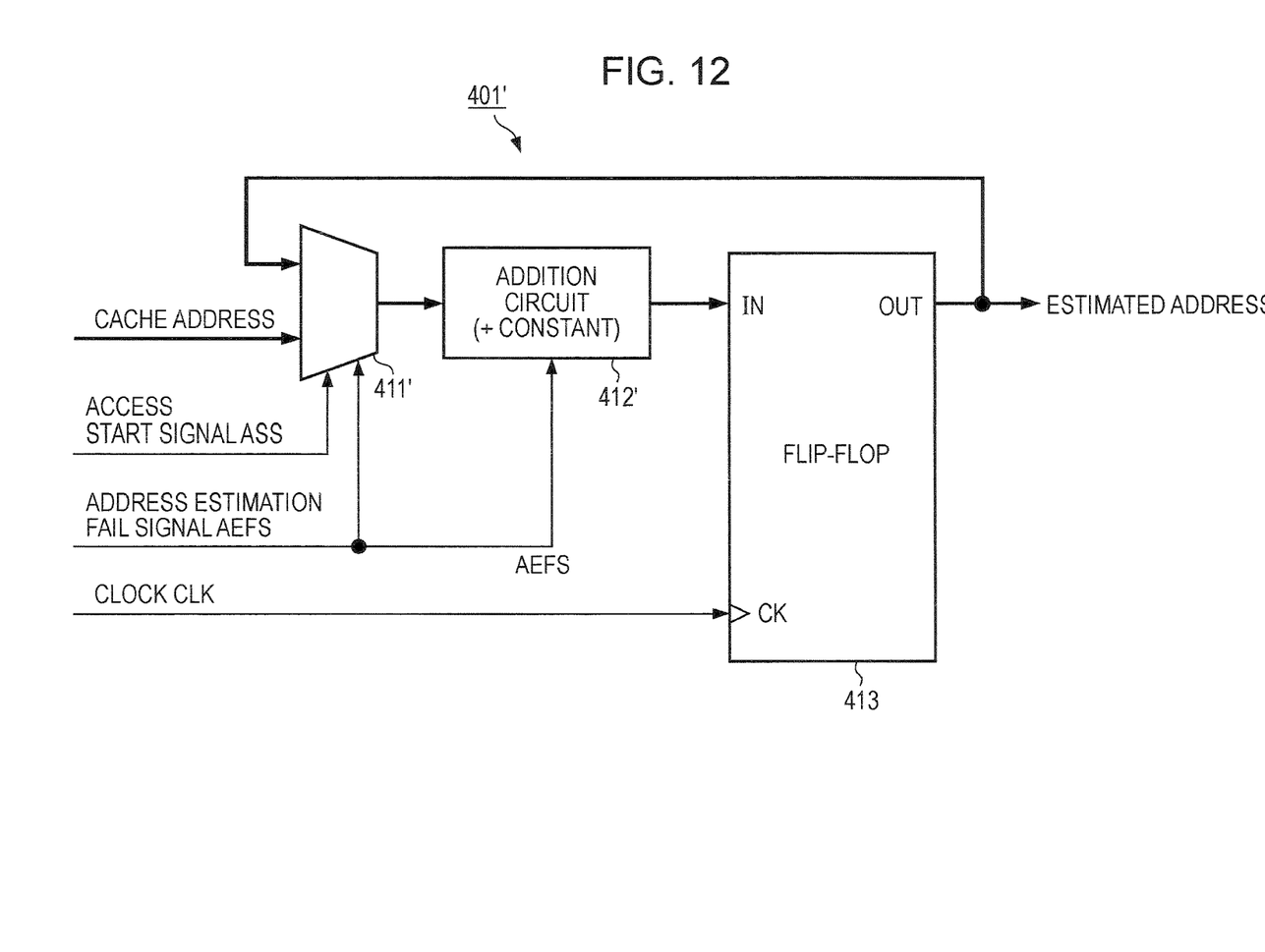
FIG. 12 is a diagram illustrating an example of an address estimation circuit in the semiconductor integrated circuit device in FIG. 10.
Figure 13:
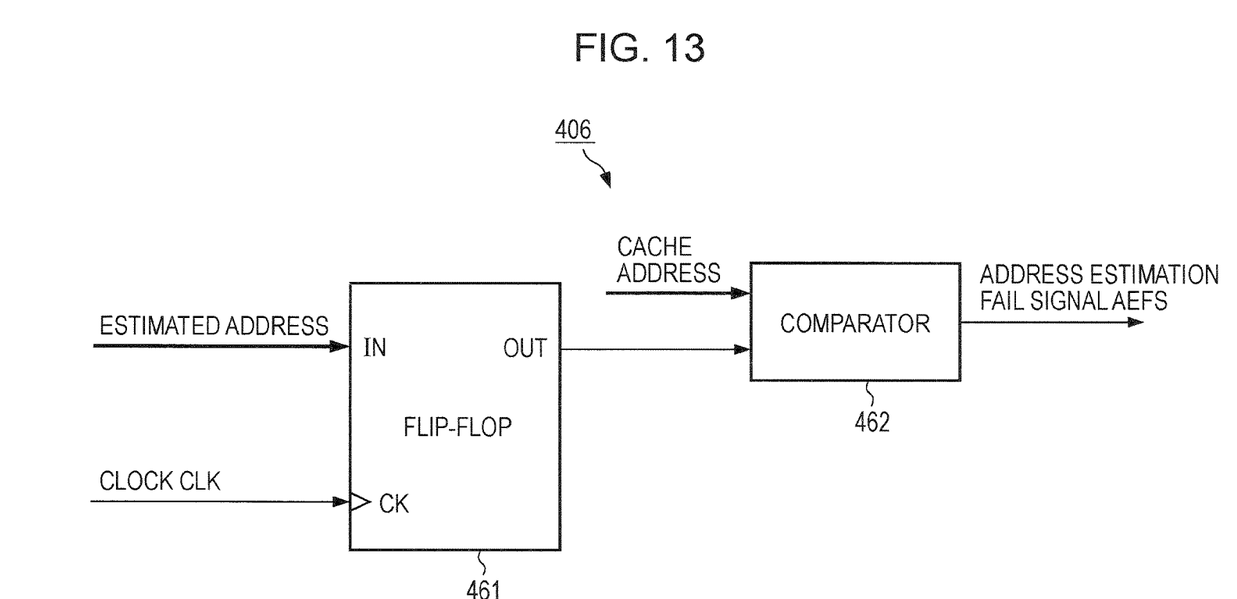
FIG. 13 is a diagram illustrating an example of an address comparison circuit in the semiconductor integrated circuit device in FIG. 10.
Figure 14:
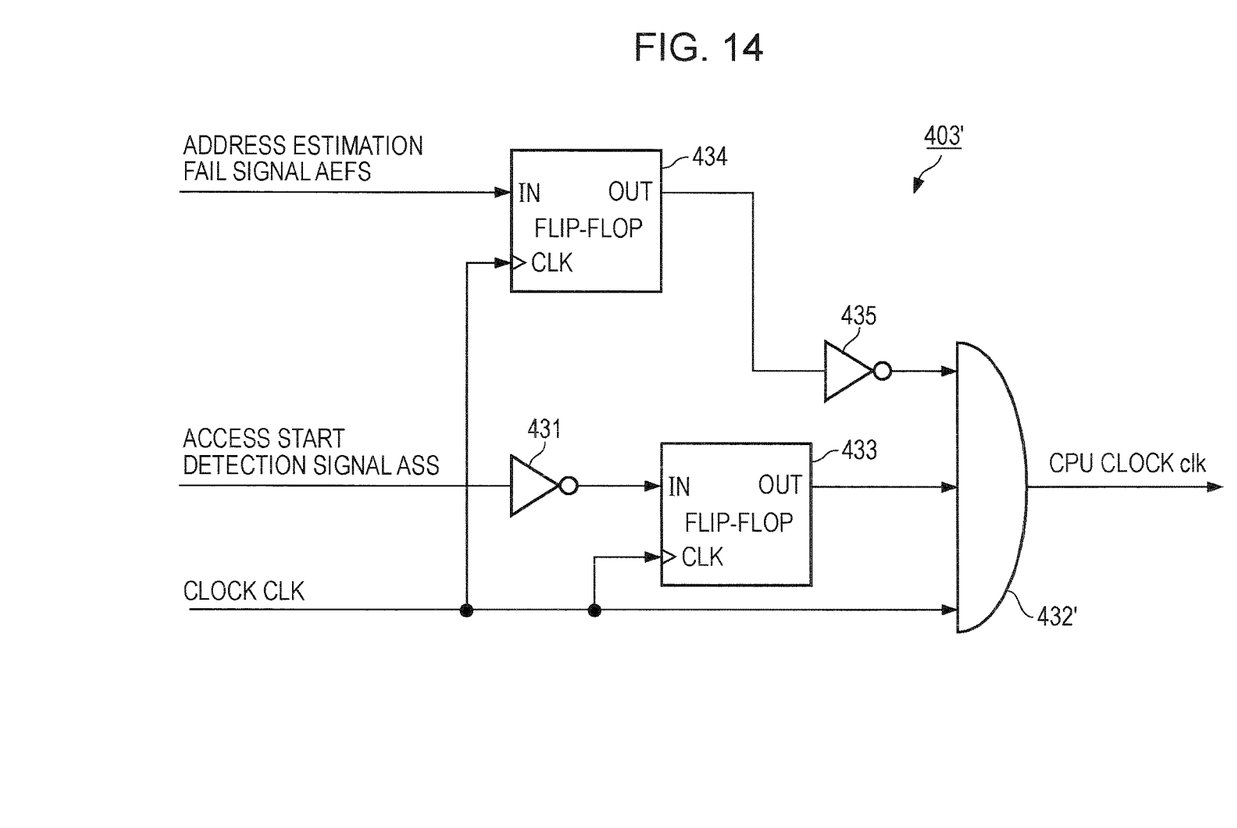
FIG. 14 is a diagram illustrating an example of a clock control circuit in the semiconductor integrated circuit device in FIG. 10.

FIG. 12 is a diagram illustrating an example of the address estimation circuit in the semiconductor integrated circuit device in FIG. 10 and FIG. 13 is a diagram is a diagram illustrating an example of the address comparison control circuit in the semiconductor integrated circuit device in FIG. 10. Then, FIG. 14 is a diagram illustrating an example of the clock control circuit in the semiconductor integrated circuit device in FIG. 10.

First, as illustrated in the example in FIG. 12, the address estimation circuit 401' includes a selector 411', an addition circuit 412', and the flip-flop 413.

The selector 411' receives the cache address from the CPU 100 and the estimated address which is output from the flip-flop 413 and selects one of them in accordance with the access start signal ASS which has been generated using the access start detection circuit 402 and the address estimation fail signal AEFS.

That is, when the access start signal ASS is asserted (set at a high level "H"), the selector 411' selects the cache address sent from the CPU 100 and supplies the selected address to the addition circuit 412' in the same manner as the selector 411 according to the first embodiment.

The access start signal ASS is set at a low level "L" for the second and succeeding read accesses made from the CPU 100, so that the selector 411' selects the estimated address and supplies it to the addition circuit 412'.

In addition, when the address estimation fail signal AEFS is asserted (set at a high level "H"), the selector 411' selects the cache address sent from the CPU 100 and supplies it to the addition circuit 412'.

In the above mentioned situation, the address estimation fail signal AEFS is also supplied to the addition circuit 412' and when the address estimation fail signal AEFS is asserted, the addition circuit 411' outputs an input address which has been input from the selector 411' as it is.

In the case that the address estimation fail signal AEFS is not asserted, the addition circuit 412' adds a constant which is defined in accordance with the specification of the CPU 100 to the input address and supplies the input address with the constant added to the input terminal of the flip-flop 413 in the same manner as the addition circuit 412 according to the first embodiment. Incidentally, the flip-flop 413 operates in the same manner as the flip-flop according to the first embodiment and hence description thereof will be omitted.

Owing to the above mentioned operations, if address estimation has not been successfully made and the address estimation fail signal AEFS is asserted from the address comparison circuit 406, the cache address (A5) sent from the CPU 100 will be output as the estimated address, as illustrated in the example in FIG. 11.

Next, as illustrated in the example in FIG. 13, the address comparison circuit 406 includes a flip-flop 461 and a comparator 462.

The flip-flop 461 takes therein the estimated address sent from the address estimation circuit 401' at a rise edge of the clock CLK. The comparator 462 compares the output signal (the estimated address) sent from the flip-flop 461 with the cache address sent from the CPU 100, and when the address values thereof are different from each other, outputs the address estimation fail signal AEFS.

Next, as illustrated in the example in FIG. 14, the clock control circuit 403' includes the inverter 431, an inverter 435, a 3-input AND gate 432', the flip-flop 433 and a flip-flop 434.

The flip-flop 434 takes therein the address estimation fail signal AEFS at a rise edge of the clock CLK.

The 3-input AND gate 432' receives a signal obtained by inverting an output signal from the flip-flop 434, an output signal which is output from the flip-flop 433 on the basis of a signal which has been obtained by inverting the access start signal ASS using the inverter 431 and has been taken into the flip-flop 433 at a rise edge of the clock CLK, and the clock CLK and ANDs these signals to generate the CPU clock clk.

As a result, as illustrated in the example in FIG. 11, the CPU clock clk is changed to a signal of a cycle which is two times that of the clock CLK in a state in which it is retained at a low level "L" in a cycle term which comes next to a cycle in which the access start signal ASS has been set at a light level "H" as in the case in the first embodiment.

Thus, in the case that the address estimation fail signal AEFS is received, generation of the CPU clock clk is stopped for a time period corresponding to two cycles of the clock CLK.

In the above mentioned situation, if the address estimation circuit fails to estimate the address to be sent, the operation will be delayed. However, the data held in the cache memory is data of a predetermined data size which is continuously stored, so that a failure in address estimation may hardly cause a delay in operation in practical use.

Incidentally, the access start detection circuit 402, the selector 404 and the flip-flop for delay 405 are the same as those in the first embodiment and hence description thereof will be omitted. In addition, the configurations of the address estimation circuit 401' illustrated in FIG. 12, the address comparison circuit 406 illustrated in FIG. 13 and the clock control circuit 403' illustrated in FIG. 14 are mere examples and may be altered in a variety of ways.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A memory control device for controlling access a cache memory by a processing unit, the memory control device comprising:
   an address estimation circuit configured to receive a first read address of the cache memory from the processing unit and estimate a second read address based on the first read address;
   an access start detection circuit configured to detect an access start of accessing the cache memory at the first read address and output an access start signal;
   a data control circuit configured to receive read data associated with the first read address from the cache memory and output the read data to the processing unit; and
   a clock control circuit configured to control a read clock to be output to the processing unit in response to the access start signal, wherein:
   the processing unit is configured to receive the read data associated with the first read address, based on the read clock from the clock control circuit; and
   the read data associated with the first read address is one cycle delayed by the data control circuit.

2. The memory control device according to claim 1, further comprising:
   a selector configured to select the first read address output from the processing unit or the second read address estimated by the address estimation circuit and output the selected address to the cache memory, wherein the selector selects the first read address upon detecting the access start of the first read address by the access start detection circuit, and the selector selects the second read address upon outputting the first read address.

3. The memory control device according to claim 1, further comprising:
   an address comparison circuit for comparing a third read address with the second read address, wherein the third read address is output following the first read address from the processing unit, and the address comparison circuit generates a fail signal when the second read address is different from the third read address.

4. The memory control device according to claim 3, wherein the clock control circuit receives the fail signal and stops sending the read clock to the processing unit, and the address estimation circuit outputs the third read address to the cache memory.

5. The memory control device according to claim 3, wherein the clock control circuit generates the read clock by a logical conjunction of the access start signal, a system clock and a one cycle delayed signal of the fail signal.

6. The memory control device according to claim 1, wherein:
   the address estimation circuit includes an addition circuit,
   the addition circuit adds a value to the first read address and makes the second read address, and
   the value is determined in accordance with a specification of the processing unit.

7. The memory control device according to claim 1, wherein the access start detection circuit generates the access start signal by a logical conjunction of a chip select signal for accessing an output of the cache memory from the processing unit and a delayed signal of a chip select signal.

8. The memory control device according to claim 7, wherein the clock control circuit controls the read clock by a logical conjunction of a signal obtained by a system clock and inverting the access start signal.

9. The memory control device according to claim 1, wherein the data control circuit comprises a flip-flop, and the read data to be output to the processing unit is delayed for a time period corresponding to one cycle by the flip-flop.

10. A method for controlling a cache memory accessed by a processing unit in a semiconductor integrated circuit, the method comprising:
    outputting a first read address generated by the processing unit to the cache memory in a case of a first access to the cache memory;
    receiving first read data associated with the first read address, based on a read clock from a clock control circuit, wherein the first read data associated with the first read address is one cycle delayed by a data control circuit;
    estimating a second read address based on the first read address;
    outputting the second read address to the cache memory;
    receiving second read data from the cache memory;
    outputting the second read data to the processing unit; and
    when a third read address output from the processing unit after the first read address is different from the second read address, outputting the third read address to the cache memory and stopping sending of the read clock to the processing unit, from the clock control circuit, to stop outputting the second read data associated with the second read address.

11. The memory control device according to claim 1, wherein the data control circuit is further configured to receive the read data associated with the first read address from the cache memory after a predetermined read access time.

12. The memory control device according to claim 1, wherein the data control circuit is further configured to receive from the cache memory the read data associated with the first read address at a rise edge of the read clock and outputs to the processing unit the read data associated with the first read address at a next rise edge of the read clock.

* * * * *